Feb. 28, 1961   J. F. GRAHAM   2,973,476
TEST CIRCUIT FOR DISTRIBUTED CAPACITY OF INDUCTANCES
Filed July 1, 1959
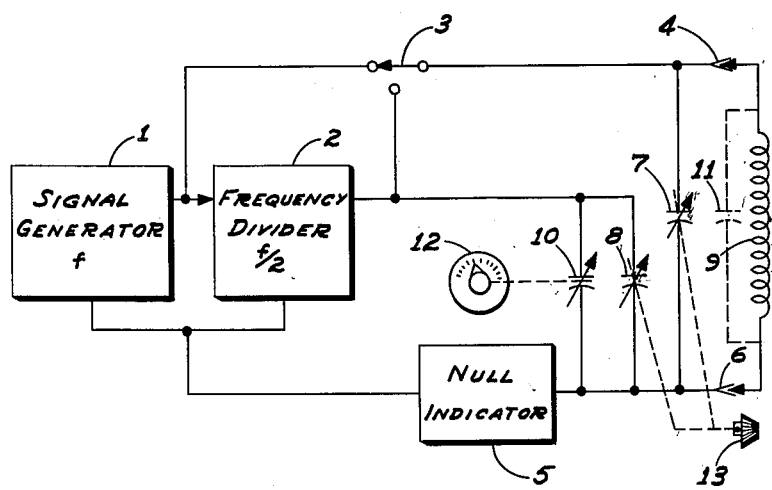
INVENTOR.
JOHN F. GRAHAM
BY
ATTORNEY
AGENT

United States Patent Office 2,973,476
Patented Feb. 28, 1961

2,973,476
TEST CIRCUIT FOR DISTRIBUTED CAPACITY OF INDUCTANCES

John F. Graham, Raytown, Mo., assignor to Collins Radio Company, Cedar Rapids, Iowa, a corporation of Iowa Filed July 1, 1959, Ser. No. 824,259

3 Claims. (Cl. 324—60)

This invention pertains to test equipment for measuring distributed capacitances of inductors, and particularly to test equiment that provides direct reading of distributed capacitances on a single dial.

An object of this invention is to provide a method of reading directly and accurately distributed capacitances of inductors.

Another object is to provide for measuring distributed capacitances test equipments that have accuracy dependent only upon characteristics of the capacitors within the equipment.

The following description and the appended claims may be more readily understood with reference to the single accompanying drawing which shows in block and schematic form the test equipment of this invention.

The equipment of this invention operates in accordance with the principle that distributed capacitance of an inductor may be computed from data that has been obtained by resonating the inductor and its distributed capacitance at two different known frequencies, the inductor being resonated by providing capacitances required for resonance in parallel with the inductor. In the equipment shown in the accompanying figure the frequencies of the two required signals have been chosen to have a frequency ratio of two-to-one. The combination of capacitors in this equipment includes a ganged variable capacitor and an additional variable capacitor that are arranged so that the additional capacitor may be readily calibrated to indicate directly the distributed capacitances of the inductors that are being tested. The equipment has been designed so that the frequency of one of the two required signals determines the frequency of the other signal for maintaining a frequency ratio of two-to-one so that the capacitance indication is accurate regardless of frequency change and of the inductance of the inductor that is being tested. Obviously, the inductor that is being tested must be within a range required to obtain resonance by using the capacitors within the test equipment at the frequencies provided by the signal generators of the test equipment.

According to the accompanying figure, the source of the two signals which have a frequency ratio of two-to-one is signal generator 1. This signal generator supplies signal directly to the test circuit for applying signal of frequency $f$ to the inductor that is to be tested and supplies signal to frequency divider 2 which applies signal at the second frequency $f/2$ to the inductor. The signal generator may be a conventional oscillator, and the frequency divider may be of the binary type comprising a multivibrator or flip-flop. These signals having a two-to-one ratio may be generated by other conventional circuit arrangements; for example, the source of signal having a frequency $f/2$ may be an oscillator, and the signal having a frequency $f$ may be supplied by a two-to-one frequency multiplier that is connected to this oscillator.

In operation equipment according to the accompanying drawing applies a signal of frequency $f$ to an inductor while the inductor is resonated by adjustment of a parallel connected capacitor. For applying a signal of frequency $f$ to the inductor, the inductor is connected between terminals 4 and 6 of the equipment test leads and switch 3 is operated to the position shown in the accompanying figure. Capacitor 7 is connected between the two terminals 4 and 6 so that it is in parallel with the inductor. The output of signal generator 1 and the null indicator 5 are connected through switch 3 to the parallel capacitor and inductor. Variable capacitor 7 is adjusted for obtaining a minimum indication on null indicator 5. Capacitor 7 is mechanically connected, or ganged, with capacitor 8 and may be considered to be two sections of a ganged capacitor such that when sections 7 and 8 are adjusted simultaneously by rotation of knob 13, the ratio of capacitance of capacitor 8 to the capacitance of capacitor 7 is constantly maintained three-to-one.

After capacitor 7 has been adjusted so that both capacitors 7 and 8 are properly positioned for resonance, switch 3 is operated to connect frequency divider 2 for applying signal having a frequency $f/2$ to the inductor 9 that is being tested. A series circuit including frequency divider 2 and null indicator 5 is connected in parallel with ganged capacitors 7 and 8, calibrated capacitor 10, and inductor 9. Calibrated capacitor 10 is then adjusted so that its capacitance, in addition to the capacitances of the previously adjusted capacitors 7 and 8, resonates inductor 9 at the frequency $f/2$. Providing dial 12 of capacitor 10 has been calibrated in capacitance units that are one-third of its actual capacitances, the reading on the dial is equal to the distributed capacitance 11 of the inductor 9 that is under test.

The relative values of capacitors 7, 8, 10, and distributed capacitance 11 can be expressed simply mathematically. If the capacitance of capacitor 7 for obtaining resonance at frequency $f$ is $C_7$ and the capacitance of capacitor 8 is equal to $(n^2-1)C_7$, the capacitance of capacitor 10 required for obtaining resonance at a frequency $f/n$ is equal to $(n^2-1)C_{11}$, $C_{11}$ being the distributed capacitance of the inductor that is being tested. A preferred, reliable arrangement of the test equipment is obtained by having $n$ equal 2 according to the example described above. Providing capacitors 7 and 8 have been adjusted simultaneously for only signal of frequency $f$ and $n$ equals 2, the distributed capacitance of the inductor that is being tested is equal to one-third of the actual capacitance of the capacitor 10 for resonance at frequency $f/2$. Dial 12 of capacitor 10 may be calibrated in units equal to one-third of its actual capacitance settings in order that the distributed capacitance of the inductor may be read directly from the dial.

Although this invention has been described with respect to a particular embodiment thereof, it is not to be so limited, as changes and modifications may be made therein which are within the scope and spirit of the invention as defined by the appended claims.

I claim:

1. Equipment for measuring the distributed capacitance of inductors comprising, means for connecting an inductor that is to be tested to said equipment, first and second circuit arrangements, switching means operable for selectively connecting said first and second circuit arrangements successively across said connected inductor, said first selected circuit arrangement including means for applying signal of frequency $f$ across said connected inductor and including capacitive means adjustable for applying a first required capacitance across said inductor to provide resonance of said inductor at frequency $f$, means in said first circuit arrangement to indicate said resonance, said capacitive means in response to being adjusted for providing said first required capacitance also being adjusted for applying a second capacitance that is equal to $n^2$ times said first required capacitance, said capacitive means applying said second capacitance across said inductor in response to selection of said second circuit arrangement by said switching means, said second circuit arrangement including a calibrated variable capacitor connected in parallel with said capacitance means and said inductor and also including means for applying a signal of frequency $f/n$ across said capacitor and said inductor, said calibrated capacitor being adjusted to resonate said connected inductor at frequency $f/n$, the distributed capacitance of said inductor being $$\frac{1}{n^2-1}$$

times the actual capacitance required by said calibrated capacitance to provide resonance at frequency $f/n$.

2. Equipment for measuring distributed capacitance of inductors comprising, a ganged variable capacitor having first and second sections that are simultaneously variable so that the capacitance of said second section is maintained $(n^2-1)$ times the capacitance of said first section, means for connecting said first section in parallel with an inductor that is to be tested, means for applying signal of frequency $f$ across said inductor and said first section, means for indicating resonance of said inductor, means for adjusting said ganged capacitor to resonate said inductor at frequency $f$, a calibrated variable capacitor having a dial calibrated in capacitive units to indicate $$\frac{1}{n^2-1}$$

times its actual capacitance, means for connecting both sections of said ganged capacitor and said calibrated capacitor in parallel with said inductor, means for disconnecting said means for applying signal of frequency $f$ from said indicator and said first section, means for applying signal of frequency $f/n$ to said parallel combination of both sections of said ganged capacitor, said calibrated capacitor and said inductor, and means for adjusting said calibrated variable capacitor to resonate said inductor at frequency $f/n$, whereby the distributed capacitance of said inductor is readable directly from said dial of said calibrated capacitor.

3. Equipment for testing distributed capacitances of inductors comprising, a pair of terminals for receiving an inductor that is to be tested, first, second, and third variable capacitors, means constraining said first and second capacitors to simultaneous operation for maintaining the capacitance of said second capacitor three times the capacitance of said first capacitor, said third capacitor being calibrated in capacitive units for indicating capacitance of one-third of the actual capacitance thereof over its range, said first capacitors being connected between said terminals, a signal generator for generating a signal of frequency $f$, switching means for connecting the output of said signal generator across said first capacitor, means for indicating that an inductor which is being tested is resonant at the frequency of an applied signal, a frequency divider having an input connected to the output of said signal generator, the frequency of the output signal of said frequency divider being $f/2$, which is one-half of the frequency of the signal of said generator, said switching means being operable for disconnecting the output of said signal generator from said first capacitor and for connecting the output of said frequency divider, said first, second, and third capacitors in parallel between said terminals, and said third capacitor being operable for resonating said inductor at the frequency $f/2$ while said first and second capacitors remain in that position required for resonating the inductor that is being tested at frequency $f$, whereby the distributed inductance of said inductor is equal to said calibrated capacitive units of said third capacitor.

References Cited in the file of this patent
UNITED STATES PATENTS 2,337,759    Loughlin _____ Dec. 28, 1943
2,475,179    Eltgroth _____ July 5, 1949

OTHER REFERENCES

Blackwell et al.: "Measuring Small Inductances," Wireless World February 1944; pp. 37–40.